United States Patent
Ericsson

(10) Patent No.: US 7,373,160 B2
(45) Date of Patent: May 13, 2008

(54) METHOD AND DEVICE FOR INDICATING AMOUNTS OF DATA IN MOBILE NETWORKS

(75) Inventor: Andreas Ericsson, Akarp (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 292 days.

(21) Appl. No.: 10/466,522

(22) PCT Filed: Jan. 16, 2002

(86) PCT No.: PCT/EP02/00403

§ 371 (c)(1),
(2), (4) Date: Jan. 13, 2004

(87) PCT Pub. No.: WO02/058326

PCT Pub. Date: Jul. 25, 2002

(65) Prior Publication Data

US 2004/0106422 A1    Jun. 3, 2004

Related U.S. Application Data

(60) Provisional application No. 60/263,763, filed on Jan. 25, 2001.

(30) Foreign Application Priority Data

Jan. 19, 2001  (GB) .................................. 0101409.1

(51) Int. Cl.
*H04B 7/00*     (2006.01)

(52) U.S. Cl. ..................................... 455/514; 455/558

(58) Field of Classification Search ............. 455/432.3, 455/433, 3.04, 407, 425, 422, 69, 514, 558, 455/406, 405, 414.1; 370/312, 392, 467, 370/469, 349, 389, 390, 393, 474, 475
See application file for complete search history.

(56) References Cited

U.S. PATENT DOCUMENTS 5,052,504 A  *  10/1991  Ikeda et al. ................... 705/21

(Continued)

FOREIGN PATENT DOCUMENTS

EP          0647055          4/1995

(Continued)

OTHER PUBLICATIONS

Office Action, Mailed Oct. 20, 2006, issued by the Japanese Patent Office in connection with Japanese Patent Application No. 2002-558687. (See accompanying foreign associate letter, cited below, for English-language explanation).

(Continued)

*Primary Examiner*—Matthew Anderson
*Assistant Examiner*—Dominic E. Rego
(74) *Attorney, Agent, or Firm*—Potomac Patent Group PLLC

(57) ABSTRACT

A mobile communication device for use in a packet switched wireless communications network includes a display, which is able to indicate an amount of data remaining from a subscribed amount. This allows the user to see how much data he can send or receive, within a prepaid subscription. The display is graphical, allowing the user to judge the amounts of data easily, as well as numerical. Advantageously, the mobile communication device calculates the amounts of data sent and received in such a way that it avoids double counting of retransmissions.

37 Claims, 4 Drawing Sheets

U.S. PATENT DOCUMENTS

| | | | | |
|---|---|---|---|---|
| 5,917,492 A | * | 6/1999 | Bereiter et al. | 715/854 |
| 6,101,378 A | | 8/2000 | Barabash et al. | |
| 6,144,847 A | * | 11/2000 | Altschul et al. | 455/407 |
| 6,173,171 B1 | * | 1/2001 | Plush et al. | 455/408 |
| 6,366,568 B1 | * | 4/2002 | Bolgiano et al. | 370/320 |
| 6,414,956 B1 | * | 7/2002 | Szczepanek | 370/392 |
| 6,543,686 B1 | * | 4/2003 | Ritter | 235/380 |
| 6,707,894 B1 | * | 3/2004 | Halford | 379/114.2 |
| 6,717,925 B1 | * | 4/2004 | Leppisaari et al. | 370/312 |
| 6,957,063 B1 | * | 10/2005 | Kåll | 455/414.1 |
| 2002/0077076 A1 | * | 6/2002 | Suryanarayana et al. | 455/406 |
| 2004/0235524 A1 | * | 11/2004 | Abuhamdeh | 455/558 |
| 2005/0026592 A1 | * | 2/2005 | Walter et al. | 455/406 |

FOREIGN PATENT DOCUMENTS

| | | |
|---|---|---|
| EP | 1065838 | 1/2001 |
| GB | 2308528 A | 6/1997 |
| JP | 09-130387 A | 5/1997 |
| JP | 10-051571 A | 2/1998 |
| JP | 010322481 | 12/1998 |
| JP | 2000-216806 A | 8/2000 |
| JP | 2000-252979 A | 9/2000 |
| JP | 2003-036871 A | 2/2003 |
| WO | WO 9320644 | 10/1993 |
| WO | WO 9726739 | 7/1997 |
| WO | 99/08457 A2 | 2/1999 |
| WO | WO 0019702 | 4/2000 |
| WO | WO 0070860 | 11/2000 |

OTHER PUBLICATIONS

Office Action, mailed Sep. 21, 2007, issued by the Japanese Patent Office in connection with Japanese Patent Application No. 2002-558687. (See accompanying foreign associate letter, cited below, for English-language explanation).

Ohtsuka Patent Office communication, dated Dec. 19, 2006, in connection with Japanese Patent Application No. 2002-558687.

Ohtsuka Patent Office communication, dated Oct. 9, 2007, in connection with Japanese Patent Application No. 2002-558687.

* cited by examiner

METHOD AND DEVICE FOR INDICATING AMOUNTS OF DATA IN MOBILE NETWORKS

The present application claims priority under 35 U.S.C. § 119(e) to U.S. Provisional Application No. 60/263,763 filed Jan. 25, 2001.

This invention relates to a communications device, and in particular to a mobile communications device which is capable of transferring data to, and receiving data from, a wireless network. For example, the invention is applicable to handsets for use in a General Packet Radio Service (GPRS) digital cellular telecommunications system.

BACKGROUND OF THE INVENTION

In a conventional second generation mobile communications system, for example operated under the Global System for Mobile Communications (GSM), a mobile subscriber is typically charged an amount which depends on the duration of his connection to the network. In the case of a prepaid phone, a subscriber pays in advance, and receives a corresponding credit.

EP-A-1030506 shows a prepaid mobile phone, which has a display, which displays the current credit value numerically on the display of the phone.

By contrast, in a third generation mobile communications system, for example operated under the General Packet Radio Service (GPRS) digital cellular telecommunications system, it is envisaged that subscribers will advantageously be able to maintain a permanent network connection. In this case, it may be inappropriate to charge the subscriber an amount which is dependent on the duration of the connection to the network. Rather, it may be more appropriate to make a charge which is related to the amount of data exchanged between the subscriber and the network.

One possibility is that a network operator may make a basic charge, for example monthly, with the subscriber being allowed to send or receive a specified amount of data within that basic charge.

SUMMARY OF THE INVENTION

According to the present invention, there is provided a mobile communications device, which includes a display, which is able to indicate an amount of data remaining from a subscribed amount.

This allows the user to see how much data he can send or receive, within a prepaid subscription.

Preferably, the display is graphical, allowing the user to judge the amounts of data easily.

Preferably, the mobile communications device calculates the amounts of data sent and received in such a way that it avoids double counting of retransmissions. If retransmissions are not counted, this means that a user does not have to pay twice for retransmissions which may be necessitated by network faults. In order to be able to measure the amounts of data in the mobile station, while ignoring retransmissions, the mobile station makes the measurements using a protocol under which the mobile station communicates with a network node.

In a further preferred embodiment of the invention, the display of the mobile station is further able to indicate the amount of data remaining to be received or transmitted in an existing session.

In accordance with another aspect of the invention, there are provided methods of operation of a mobile communications device in accordance with the first aspect of the invention.

It should be emphasised that the term "comprises/comprising" when used in this specification is taken to specify the presence of stated features, integers, steps or components but does not preclude the presence or addition of one or more other features, integers, steps, components or groups thereof.

DETAILED DESCRIPTION OF PREFERRED EMBODIMENTS

Figure 1:
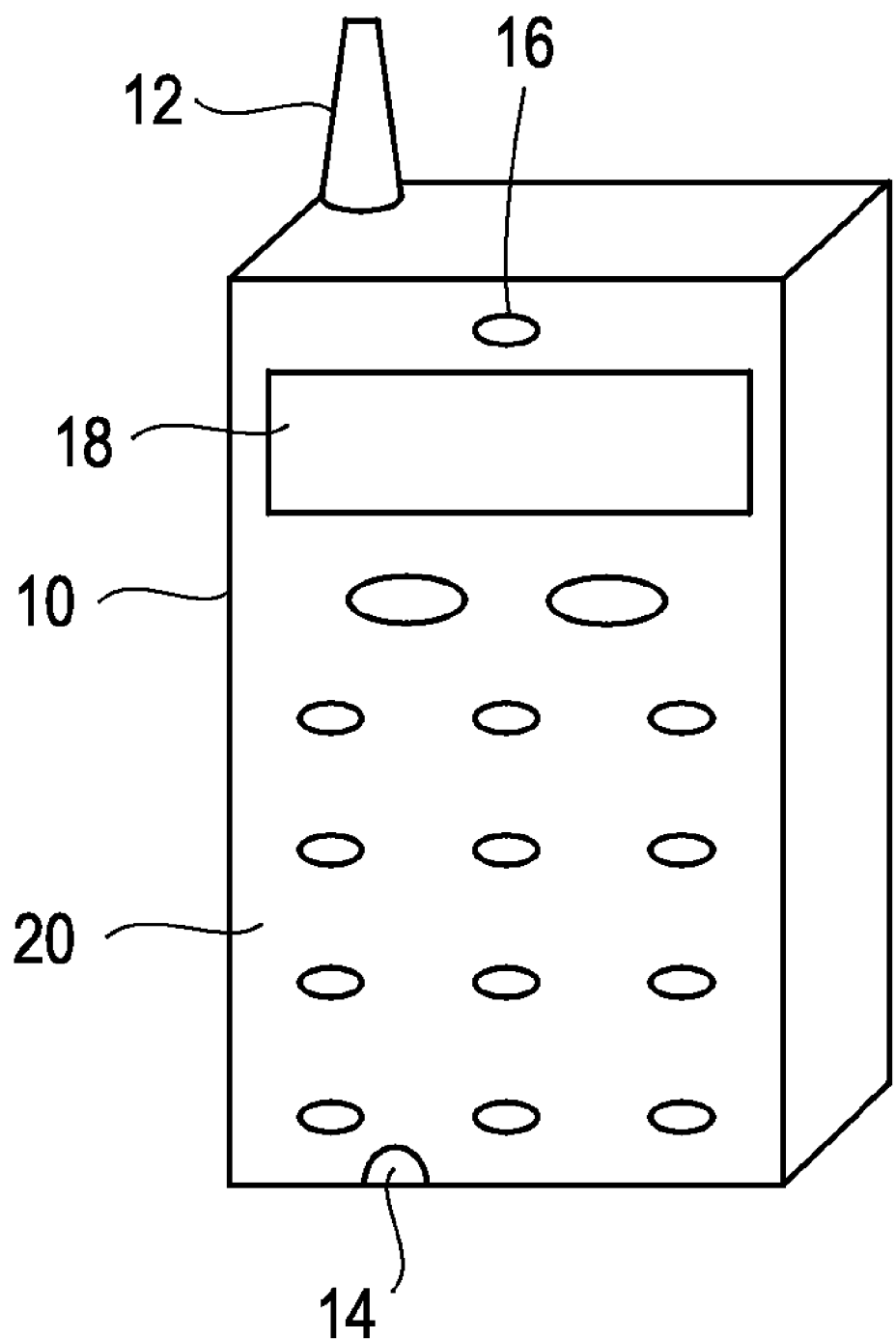
FIG. 1 shows a mobile communications device in accordance with the present invention.

FIG. 1 shows a mobile phone 10, which implements the present invention. Although FIG. 1 shows a mobile phone, the invention is generally applicable to portable radio communication equipment or mobile radio terminals, such as mobile telephones, pagers, communicators, electronic organisers, smartphones, personal digital assistants (PDAs), or the like, in particular to such devices which can be operated in packet switched wireless communications networks.

Figure 2:
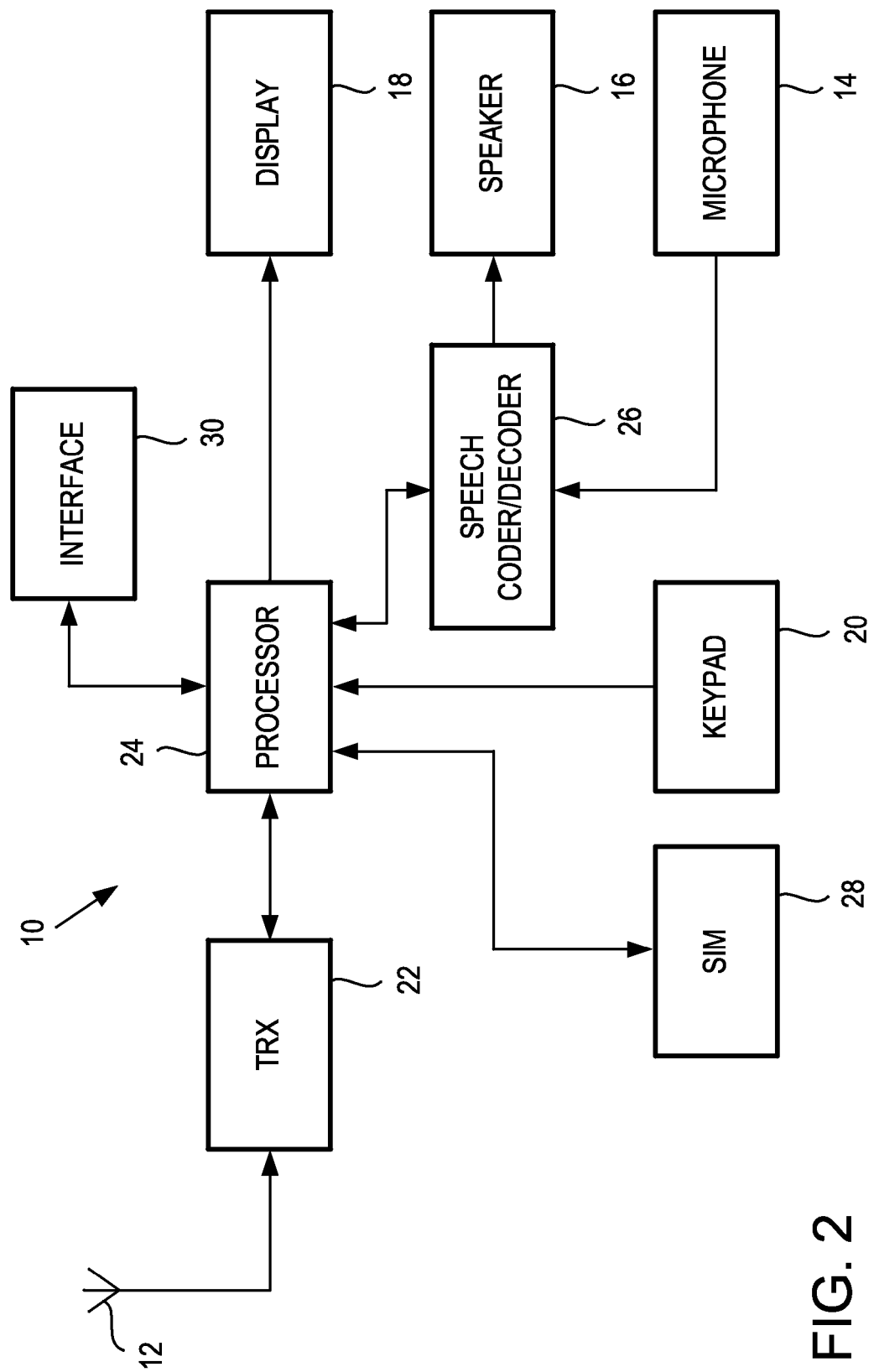
FIG. 2 is a block schematic diagram of the mobile communications device of FIG. 1.

FIG. 2 is a block schematic diagram, illustrating the operational connections between the various components thereof.

Thus, the phone 10 includes an antenna 12, microphone 14, speaker 16, display 18, and keypad 20, all of which have their conventional functions.

The antenna is connected to transceiver circuitry 22, which is further connected to a processor 24. The processor 24 controls the operation of the phone 10, using appropriate software. The transceiver circuitry 22 receives incoming radio frequency signals from the antenna 12, and downconverts and demodulates them for use by the processor 24. The transceiver circuitry 22 also receives data signals from the processor 24, and then modulates them and upconverts them to radio frequency for transmission via the antenna 12.

The microphone 14 and speaker 16 are connected to the processor 24 through a voice coder/decoder 26, which converts the signals into appropriate formats.

The phone 10 further includes a removable Subscriber Identity Module (SIM) card 28, which is a removable smart card, which stores information about the subscriber. Of particular relevance to this invention is the fact a subscriber may have a prepaid subscription, allowing him to receive or transmit a certain quantity of data in a subscription period. For example, a subscriber may pay a monthly subscription, entitling him to receive or transmit, say, 50 megabytes of data during that period. All such subscription information is stored on the SIM card 28.

The phone of FIGS. 1 and 2 also includes an interface 30, for connection to an external device. For example, the external device may be a portable, or laptop, computer. The interface may be wired or wireless, for example using an infrared link or using the Bluetooth short range radio link. The interface 30 can therefore allow the external device to connect to remote devices over the wireless communications network.

Figure 3:
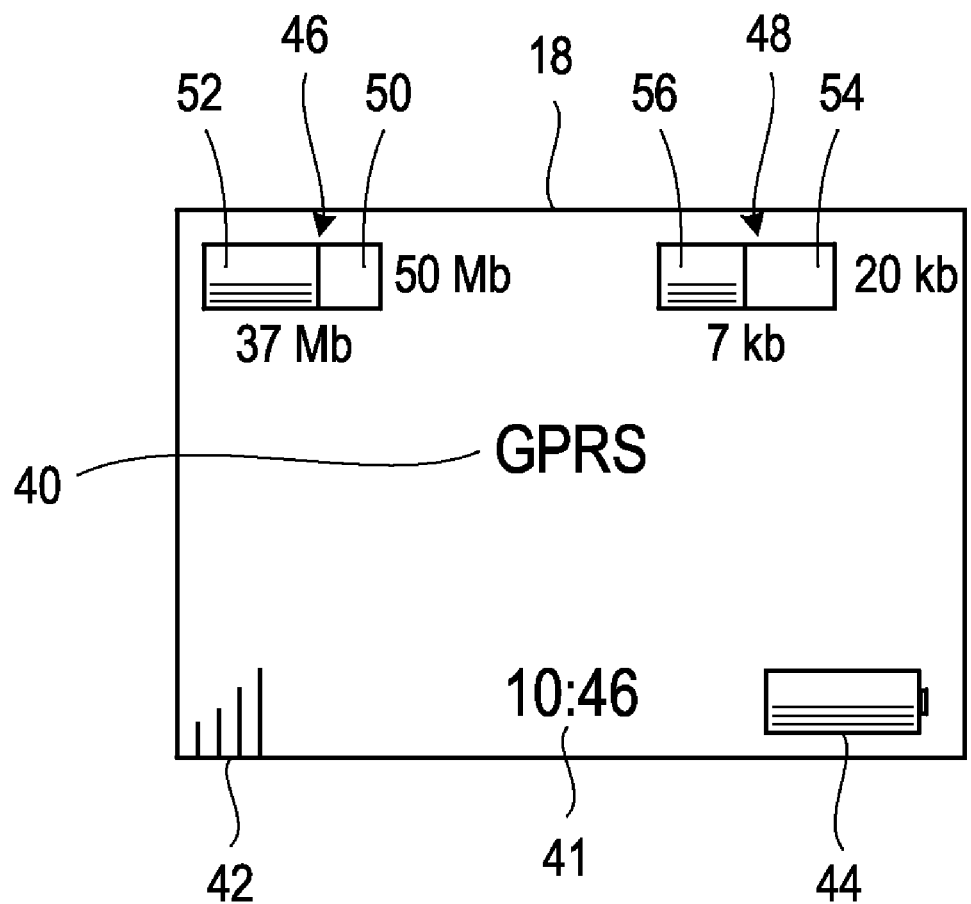
FIG. 3 shows a display screen of the mobile communications device of FIG. 1, illustrating the operation of the present invention.

The display 18 may conveniently be an LCD display, suitable for displaying status information etc., or may be any other suitable type of display. FIG. 3 shows the information which is provided on the display 18 in accordance with the invention.

Thus, in FIG. 3, the display indicates the network to which the device is connected 40, the current time 41, the received signal strength 42 and the battery charge level 44. In addition to these conventional features, the display 18 also indicates the remaining amount of subscribed data 46 and the remaining amount of data in a current session 48.

As is conventional, the user can scroll through various available options using the keypad 20 of the phone, and can choose whether or not to display either of the indicators 46, 48.

When the user chooses to display the indicators, they each preferably show a total amount of data and a remaining amount of data.

Thus, the indicator 46 includes a bar 50, the length of which indicates the total amount of data which the user is entitled to send or receive in a month, and also includes a numerical indication of the amount of data, namely 50 megabytes in this case. The bar 50 includes a shaded region 52, the length of which indicates the remaining amount of the subscribed amount of data. Thus, this amount is indicated graphically. The amount, namely 37 megabytes in this case is also indicated numerically.

Similarly, during a session, namely a download from the network or a transmission of a large file to the network, the indicator 48 shows the remaining amount of data in the current session. Thus, somewhat similarly to the indicator 46, the indicator 48 includes a bar 54, the length of which indicates the total amount of data to be sent or received as part of the session, and also includes a numerical indication of the amount of data, namely 20 kilobytes in this case. The bar 54 includes a shaded region 56, the length of which indicates the remaining amount of data in the session, and this amount is also indicated numerically, namely 7 kilobytes in this case.

The information about the total amount of data, which the user is entitled to send or receive in a month, is stored on the SIM card 28, and can be retrieved by the processor 24 for supply to the display 18.

The information about the total amount of data to be sent or received as part of the session is also generally available. In the case of data to be transmitted, the size of a file can generally be read. In the case of data to be received, the size of a download can be determined from the remote device.

However, the information about the remaining amount of the subscribed amount of data must be calculated from other information. In particular, it is of course necessary to calculate the remaining amount of the subscribed amount of data by first calculating the amount of data which has been received or sent.

Figure 4:
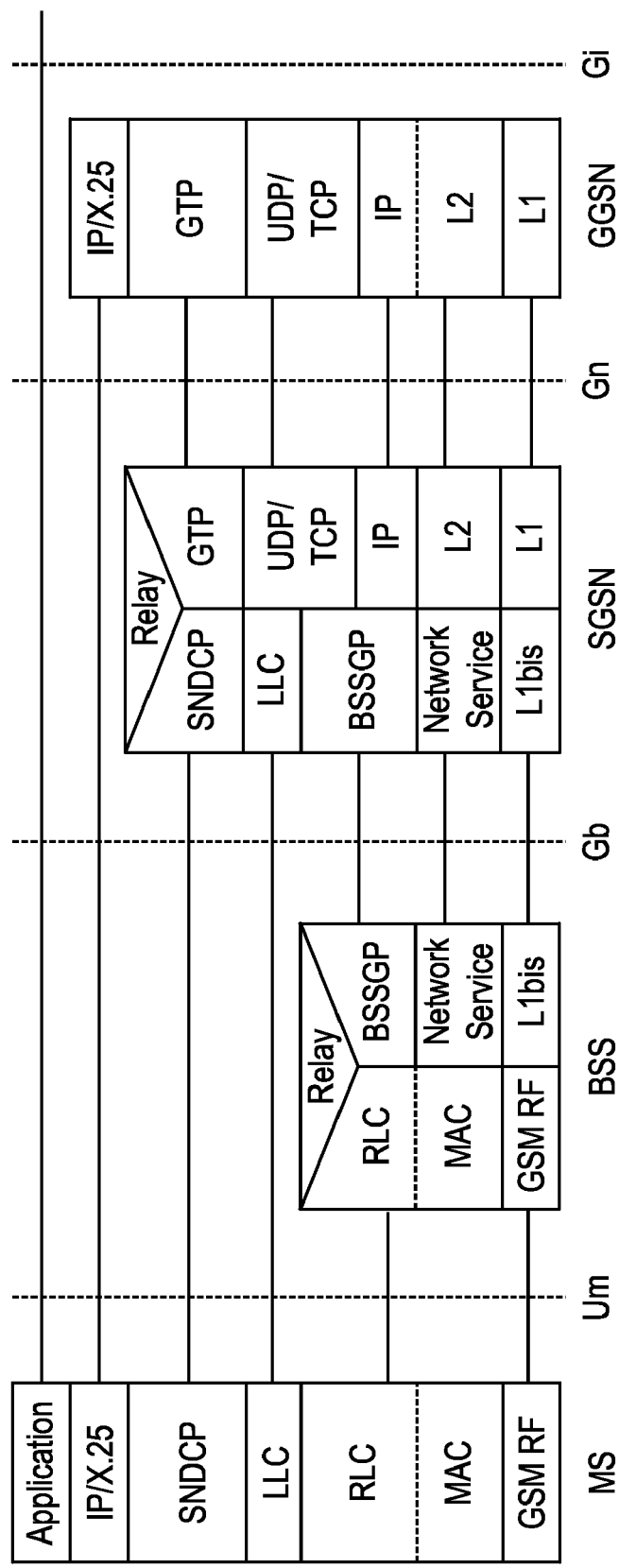
FIG. 4 illustrates the protocol structure by which the mobile communications device of FIG. 1 communicates with a wireless network.

FIG. 4 shows the transmission plane, that is, the protocol structure, in the General Packet Radio Service (GPRS) digital cellular telecommunications system, as defined at ETSI EN 301 344 GSM 03.60 version 7.4.0, page 22, section 5.6.1. Thus, this diagram shows the protocols which are used between the mobile station (MS), base station system (BSS), serving GPRS support node (SGSN) and gateway GPRS support node (GGSN).

When calculating the amount of data which has been received or sent, it is preferable to ignore header information associated with the transmitted packets of data, and to ignore retransmissions of packets. That is, the GPRS system includes mechanisms whereby, if a packet of data is not correctly received, it can be retransmitted. However, it is preferable that the subscriber should only be charged once for each packet, irrespective of the number of transmissions which may have been necessary. This will be more acceptable to the subscriber.

If the network will ignore header information, and retransmissions, when calculating the cost to the subscriber, the mobile phone should similarly ignore them when calculating the amount of data received or transmitted.

When the data is being transferred to or from an application which is running in the mobile phone itself, the amount of raw data, excluding header information and retransmissions, can be calculated in any convenient way.

However, as discussed previously, the mobile phone may advantageously be being used to connect a laptop computer to another device over the GPRS network. In that case, there is no protocol between the mobile phone and the laptop computer which allows the mobile phone to distinguish between data which is being transmitted for the first time, and retransmissions of unsuccessfully transmitted data.

Therefore, since most retransmissions are done on one of the lower layers, such as the Logical Link Control (LLC) protocol or Radio Link Control and Medium Access Control (RLC/MAC) protocols, the amount of transmitted data can most accurately be measured at the Subnetwork Dependent Convergence Protocol (SNDCP), at least when the application is running on a separate device from the mobile phone.

Since it is preferable to make the measurement at the same point whether the application is running on a separate device or on the mobile phone itself, the amount of transmitted or received data is therefore measured between the Subnetwork Dependent Convergence Protocol (SNDCP) and the Internet Protocol (IP) or X.25, whichever of these latter two protocols is being used.

That is, the mobile phone measures the number of bits transferred from the SNDCP to the IP/X.25, in the case of incoming data, or transferred from the IP/X.25 to the SNDCP, in the case of outgoing data.

Information about the remaining amount of data in a session can be calculated in the same way as the information about the remaining amount of the subscribed amount of data, by measuring the amount of data transmitted or received to date.

In the system described above, the mobile phone measures the amount of data received and sent. However, the amount charged by the network operator to the subscriber will depend on the amount of data measured by the network itself. Information concerning the amount of data measured by the network can be sent periodically from the network to the mobile phone. The information provided by the network can then be compared in the phone with the amount measured by the phone itself, with the user being alerted in the event of any significant discrepancy. Alternatively, if the information concerning the amount of data measured by the network is sent sufficiently frequently from the network to the mobile phone, it becomes unnecessary for the phone to make any measurements, and the display can rely entirely on the information received from the network.

The description above assumes that the subscriber will be charged for all of the data transferred. However, in practice, this will not be the case. For example, data which is to be sent or received at no cost to the subscriber may have a specific flag attached thereto. If the displayed information, relating to the remaining amount of the unsubscribed data, is then to be obtained from calculations in the mobile phone, the phone will need to determine whether each transmission has that flag attached to it.

There is thus described a mechanism which allows the user to see easily how much of a subscribed amount of data is remaining.

The invention claimed is:

1. A mobile communications device, comprising:
  a storage device which stores an indication of a subscribed amount of data;
  a display which provides a visual indication of an amount of data remaining from the subscribed amount of data;
  processing circuitry for calculating an amount of data transmitted and received, and for calculating the amount of data remaining from the subscribed amount of data on the basis of the calculated amount of data transmitted and received,
  wherein the processing circuitry calculates the amount of data transmitted and received, excluding header information, and
  wherein the amount of data transmitted and received is indicative of a number of bits that were transmitted and received.

2. A mobile communications device as claimed in claim 1, wherein the visual indication of the amount of data remaining from the subscribed amount of data comprises a first region of the display, having a size related to the subscribed amount of data, and a second region of the display within the first region, having a size related to the amount of data remaining from the subscribed amount of data.

3. A mobile communications device as claimed in claim 1, wherein the processing circuitry calculates the amount of data transmitted and received, excluding retransmissions.

4. A mobile communications device as claimed in claim 3, wherein the processing circuitry calculates the amount of data transmitted and received between a Subnetwork Dependent Convergence Protocol (SNDCP) and IP/X.25.

5. A mobile communications device as claimed in claim 1, wherein the processing circuitry calculates an amount of data in a session.

6. A mobile communications device as claimed in claim 5, wherein the display provides a visual indication of an amount of data remaining in said session.

7. A mobile communications device as claimed in claim 6, wherein the visual indication of the amount of data remaining in said session comprises a third region of the display, having a size related to the amount of data in the session, and a fourth region of the display within the third region, having a size related to the amount of data remaining from the session.

8. A mobile communications device as claimed in claim 1, wherein the mobile communications device obtains information, relating to the amount of data remaining from the subscribed amount of data, from a signal received from a mobile communications network.

9. A method of operating a mobile communications device, comprising:
  storing an indication of a subscribed amount of data;
  providing a visual indication of an amount of data remaining from the subscribed amount of data; and
  calculating an amount of data transmitted and received, excluding header information, and calculating the amount of data remaining from the subscribed amount of data on the basis of the calculated amount of data transmitted and received,
  wherein the amount of data transmitted and received is indicative of a number of bits that were transmitted and received.

10. A method as claimed in claim 9, wherein the visual indication of the amount of data remaining from the subscribed amount of data comprises a first region of the display, having a size related to the subscribed amount of data, and a second region of the display within the first region, having a size related to the amount of data remaining from the subscribed amount of data.

11. A method as claimed in claim 9, comprising:
  calculating the amount of data transmitted and received, excluding retransmissions.

12. A method as claimed in claim 11, comprising:
  calculating the amount of data transmitted and received between a Subnetwork Dependent Convergence Protocol (SNDCP) and IP/X.25.

13. A method as claimed in claim 9, further comprising:
  calculating an amount of data in a session.

14. A mobile communications device as claimed in claim 13, further comprising:
  providing a visual indication of an amount of data remaining in said session.

15. A method as claimed in claim 14, wherein the visual indication of the amount of data remaining in said session comprises a third region of the display, having a size related to the amount of data in the session, and a fourth region of the display within the third region, having a size related to the amount of data remaining from the session.

16. A method as claimed in claim 9, further comprising:
  obtaining information, relating to the amount of data remaining from the subscribed amount of data, from a signal received from a mobile communications network.

17. A mobile communications device comprising:
  a storage device for storing an indication of a subscribed amount of data;
  a display for providing a visual indication of an amount of data remaining from the subscribed amount of data; and
  means for receiving a signal from a mobile communications network, indicating a an amount of data transmitted and received, excluding header information, and for calculating the amount of data remaining from the subscribed amount of data on the basis of the indicated amount of data transmitted and received,
  wherein the amount of data transmitted and received is indicative of a number of bits that were transmitted and received.

18. A mobile communications device as claimed in claim 17, wherein the visual indication of the amount of data remaining from the subscribed amount of data comprises a first region of the display, having a size related to the subscribed amount of data, and a second region of the display within the first region, having a size related to the amount of data remaining from the subscribed amount of data.

19. A mobile communications device as claimed in claim 17, wherein the processing circuitry calculates the amount of data transmitted and received, excluding retransmissions.

20. A mobile communications device as claimed in claim 19, wherein the processing circuitry calculates the amount of data transmitted and received between a Subnetwork Dependent Convergence Protocol (SNDCP) and IP/X.25.

21. A mobile communications device as claimed in claim 17, comprising means for calculating an amount of data in a session.

22. A mobile communications device as claimed in claim 21, wherein the display is further for providing a visual indication of an amount of data remaining in said session.

23. A mobile communications device as claimed in claim 22, wherein the visual indication of the amount of data remaining in said session comprises a third region of the display, having a size related to the amount of data in the session, and a fourth region of the display within the third region, having a size related to the amount of data remaining from the session.

24. A method of operating a mobile communications device, the method comprising:
storing an indication of a subscribed amount of data;
providing a visual indication of an amount of data remaining from the subscribed amount of data; and
receiving a signal from a mobile communications network, indicating an amount of data transmitted and received, excluding header information, and calculating the amount of data remaining from the subscribed amount of data on the basis of the indicated amount of data transmitted and received,
wherein the amount of data transmitted and received is indicative of a number of bits that were transmitted and received.

25. A method as claimed in claim 24, wherein the visual indication of the amount of data remaining from the subscribed amount of data comprises a first region of the display, having a size related to the subscribed amount of data, and a second region of the display within the first region, having a size related to the amount of data remaining from the subscribed amount of data.

26. A method as claimed in claim 24, comprising calculating the amount of data transmitted and received, excluding retransmissions.

27. A method as claimed in claim 26, comprising calculating the amount of data transmitted and received between a Subnetwork Dependent Convergence Protocol (SNDCP) and IP/X.25.

28. A method as claimed in claim 24, further comprising calculating an amount of data in a session.

29. A method as claimed in claim 28, further comprising providing a visual indication of an amount of data remaining in said session.

30. A method as claimed in claim 29, wherein the visual indication of the amount of data remaining in said session comprises a third region of the display, having a size related to the amount of data in the session, and a fourth region of the display within the third region, having a size related to the amount of data remaining from the session.

31. A method as claimed in claim 24, further comprising obtaining information, relating to the amount of data remaining from the subscribed amount of data, from a signal received from a mobile communications network.

32. A mobile communications device, comprising:
a storage device which stores an indication of a subscribed amount of data;
a display which provides a visual indication of an amount of data remaining from the subscribed amount of data; and
processing circuitry for calculating an amount of data transmitted and received, and for calculating the amount of data remaining from the subscribed amount of data on the basis of the calculated amount of data transmitted and received,
wherein the processing circuitry calculates the amount of data transmitted and received, excluding retransmissions.

33. A method of operating a mobile communications device, comprising:
storing an indication of a subscribed amount of data;
providing a visual indication of an amount of data remaining from the subscribed amount of data; and
calculating an amount of data transmitted and received excluding retransmissions, and calculating the amount of data remaining from the subscribed amount of data on the basis of the calculated amount of data transmitted and received.

34. A mobile communications device, comprising:
a storage device that stores an indication of a subscribed amount of data;
a display that provides a visual indication of an amount of data remaining from the subscribed amount of data;
processing circuitry for calculating an amount of data transmitted and received, and for calculating the amount of data remaining from the subscribed amount of data on the basis of the calculated amount of data transmitted and received,
wherein:
calculating the amount of data transmitted and received comprises ignoring header information of the transmitted and received data; and
the amount of data transmitted and received is indicative of a number of bits that were transmitted and received.

35. The mobile communications device of claim 34, wherein ignoring header information of the transmitted and received data comprises ignoring all header information associated with a total amount of transmitted and received data.

36. A method of operating a mobile communications device, comprising:
storing an indication of a subscribed amount of data;
providing a visual indication of an amount of data remaining from the subscribed amount of data;
calculating an amount of data transmitted and received; and
calculating the amount of data remaining from the subscribed amount of data on the basis of the calculated amount of data transmitted and received,
wherein:
calculating the amount of data transmitted and received comprises ignoring header information of the transmitted and received data; and
the amount of data transmitted and received is indicative of a number of bits that were transmitted and received.

37. The method of claim 36, wherein ignoring header information of the transmitted and received data comprises ignoring all header information associated with a total amount of transmitted and received data.

* * * * *